United States Patent
Bruno et al.

(10) Patent No.: US 10,035,602 B2
(45) Date of Patent: Jul. 31, 2018

(54) NO PRIMARY HEAT EXCHANGER AND BLEED AIR (CABIN DISCHARGE AIR) ASSIST

(71) Applicant: Hamilton Sundstrand Corporation, Windsor Locks, CT (US)

(72) Inventors: Louis J. Bruno, Ellington, CT (US); Donald E. Army, Enfield, CT (US); Thomas M. Zywiak, Southwick, MA (US); Harold W. Hipsky, Willington, CT (US); Erin G. Kline, Vernon, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 51 days.

(21) Appl. No.: 15/176,601

(22) Filed: Jun. 8, 2016

(65) Prior Publication Data
US 2016/0355270 A1    Dec. 8, 2016

Related U.S. Application Data

(60) Provisional application No. 62/172,453, filed on Jun. 8, 2015.

(51) Int. Cl.
| | | |
|---|---|---|
| *B64D 13/08* | (2006.01) | |
| *B64D 13/04* | (2006.01) | |
| *B64D 13/06* | (2006.01) | |

(52) U.S. Cl.
CPC ...... *B64D 13/06* (2013.01); *B64D 2013/0618* (2013.01); *B64D 2013/0644* (2013.01); *B64D 2013/0648* (2013.01); *B64D 2013/0662* (2013.01); *Y02T 50/56* (2013.01)

(58) Field of Classification Search
CPC .................. B64D 13/08; B64D 13/04; B64D 2013/0618; B64D 13/06; B64D 2013/0648; B64D 2013/0644; B64D 2013/0662; B64D 2013/0696; B64D 2013/0688; B64D 13/02; Y02T 50/56; Y02T 50/44; F02C 9/18; F02C 3/04
USPC .................................................. 62/401, 241
See application file for complete search history.

(56) References Cited

U.S. PATENT DOCUMENTS

| | | | |
|---|---|---|---|
| 4,263,786 A | 4/1981 | Eng | |
| 4,312,191 A | 1/1982 | Biagini | |
| 4,419,926 A | 12/1983 | Cronin et al. | |
| 5,145,124 A | 9/1992 | Brunskill et al. | |
| 5,461,882 A | 10/1995 | Zywiak | |
| 5,967,461 A | 10/1999 | Farrington | |
| 6,124,646 A | 9/2000 | Artinian et al. | |
| 6,272,859 B1 * | 8/2001 | Barnes | F02B 37/24 |
| | | | 60/602 |

(Continued)

OTHER PUBLICATIONS

ISR/WO, dated Sep. 9, 2016.

*Primary Examiner* — Mohammad M Ali
(74) *Attorney, Agent, or Firm* — Cantor Colburn LLP

(57) ABSTRACT

An airplane is provided. The airplane includes a pressurized compartment and an environmental control system. The environmental control system includes a compressing device. The compressing device includes a compressor and a turbine. The airplane also includes a first flow of first medium configured to enter the pressurized compartment and a second flow of the first medium configured to enter the turbine.

19 Claims, 9 Drawing Sheets

(56) References Cited

U.S. PATENT DOCUMENTS

| | | | |
|---|---|---|---|
| 6,360,732 B1* | 3/2002 | Bailey | F01N 13/107 |
| | | | 123/568.12 |
| 6,908,062 B2 | 6/2005 | Munoz et al. | |
| 7,040,112 B2* | 5/2006 | Axe | B64D 13/06 |
| | | | 62/401 |
| 7,849,702 B2 | 12/2010 | Parikh | |
| 8,272,930 B2 | 9/2012 | Klimpel et al. | |
| 8,572,996 B2 | 11/2013 | Dittmar et al. | |
| 8,915,095 B2 | 12/2014 | Bruno et al. | |
| 2004/0089016 A1* | 5/2004 | Axe | B64D 13/06 |
| | | | 62/402 |
| 2004/0172963 A1* | 9/2004 | Axe | B64D 13/06 |
| | | | 62/401 |
| 2008/0264084 A1* | 10/2008 | Derouineau | B64D 13/06 |
| | | | 62/172 |
| 2013/0111938 A1 | 5/2013 | Mevenkamp et al. | |
| 2013/0133348 A1 | 5/2013 | Squier | |
| 2013/0160472 A1 | 6/2013 | Klimpel et al. | |
| 2015/0065025 A1 | 3/2015 | Bruno et al. | |
| 2015/0107261 A1 | 4/2015 | Moes et al. | |
| 2015/0166187 A1 | 6/2015 | Durbin et al. | |
| 2015/0251765 A1 | 9/2015 | Jonqueres et al. | |
| 2015/0251766 A1 | 9/2015 | Atkey | |
| 2015/0314878 A1 | 11/2015 | Lukens et al. | |
| 2016/0083100 A1 | 3/2016 | Bammann et al. | |

* cited by examiner ns with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Unfortunately, each of these approaches provides limited efficiency with respect to engine fuel burn.

NO PRIMARY HEAT EXCHANGER AND BLEED AIR (CABIN DISCHARGE AIR) ASSIST

CROSS-REFERENCES TO RELATED APPLICATIONS

This patent application claims priority to U.S. Provisional Patent Application Ser. No. 62/172,453, filed Jun. 8, 2015 which is incorporated herein by reference in its entirety.

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin. Unfortunately, each of these approaches provides limited efficiency with respect to engine fuel burn.

BRIEF DESCRIPTION

According to one embodiment, an airplane is provided. The airplane comprises a pressurized compartment; an environmental control system comprising a compressing device, the compressing device comprising a compressor and a turbine; a first flow of first medium configured to enter the pressurized compartment; and a second flow of the first medium configured to enter the turbine.

According to an embodiment, an airplane is provided. The airplane comprise a pressurized compartment; an environmental control system comprising a compressing device, the compressing device comprising a compressor and a turbine; a first flow air configured to enter the pressurized compartment and configured to enter the compressor in accordance with a mode of operation; and a second flow air configured to enter the turbine and to be sent overboard after exiting the turbine.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein by operating an environmental control system that utilize a medium provided at pressures as low as 2.5 psi below a cabin pressure, while eliminating a primary heat exchanger, to provide the medium for cabin pressurization at high fuel burn efficiency. The medium can generally be air, while other examples include gases, liquids, fluidized solids, or slurries.

Figure 1:
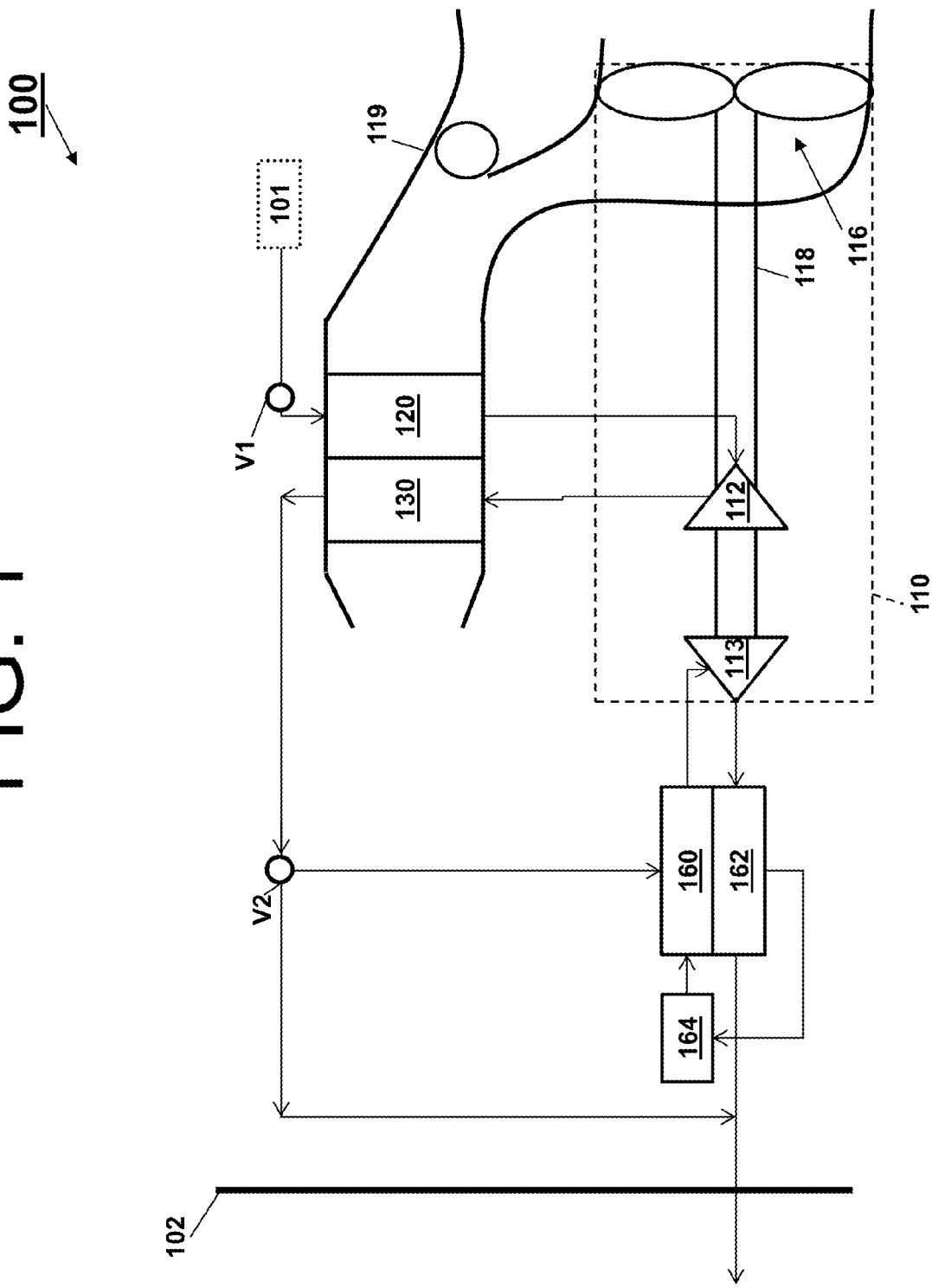
FIG. 1 is a diagram of an schematic of an environmental control system according to an embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 comprises a compressor 112, a turbine 113, a fan 116, and a shaft 118. The system 100 also comprises a primary heat exchanger 120, a secondary heat exchanger 130, a reheater 160, a condenser 162, and a water extractor 164.

The compressing device 110 is a mechanical device that includes components for performing thermodynamic work on the medium (e.g., extracts or works on the medium by raising and/or lowering pressure and by raising and/or lowering temperature). Examples of the compressing device 110 include an air cycle machine, a three-wheel machine, a four wheel-machine, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 113. The turbine 113 is mechanical device that drives the compressor 112 and the fan 116 via the shaft 118.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 162 and the reheater 160 are particular types of heat exchangers. The water extractor 164 is a mechanical device that performs a process of taking water from the medium. Together, the condenser 162, the water extractor 164, and/or the reheater 160 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by solid-lined arrows. A valve V1 (e.g., a mass flow control valve) controls the flow of the medium from the inlet 101 to the system 100. Further, a valve V2 controls whether the flow of the medium from the secondary heat exchanger 130 bypasses the condenser 162 in accordance with a mode of the system 100. A combination of components of the system 100 can be referred to as an air conditioning pack or a pack. The pack can begin at a valve V1 and conclude as air exits the condenser 162. An interface of the pack (a pack interface) can be at the valve V1.

The system 100 will now be described in view of the above aircraft embodiment. In the aircraft embodiment, the medium can be air and the system 100 can be an environmental control system. The air supplied to the environmental control system at the inlet 101 can be said to be "bled" from a turbine engine or an auxiliary power unit. When the air is being provided by the turbine engine or the auxiliary power unit connected to the environmental control system, such as from the inlet 101, the air can be referred to as bleed air (e.g., pressurized air that comes from an engine or an auxiliary power unit; note that the 'pressurized air' could be supplied by an electrical air compressor used in electric environmental control architectures). The temperature, humidity, and pressure of the bleed air vary widely depending upon a compressor stage and revolutions per minute of the turbine engine.

The bleed air supplied to the system 100 can be provided by a bleed system. The bleed system can include a plurality of ports. In an embodiment, a method of selecting a bleed port on an engine that is suitable to provide the medium for cabin pressurization at high fuel burn efficiency to the system is provided.

The method includes receiving engine data from original equipment manufacturers. The engine data can include pressure and temperature combinations of the bleed air for every stage on the engine with respect to all flight segments. For example, a first segment can include ground idle, a second segment can include taxi, a third segment can include climb, a fourth segment can include cruise, a fifth segment can include descend, and a sixth segment can include hold. Other examples of flight segments include take-off, send again, etc. Note that one or more fight segments can be placed into buckets to ease the evaluation of the engine data.

The method also includes choosing one or more bleed ports that optimally meet a required cabin pressurization for all flight segments. For instance, to optimally meet the required cabin pressurization, each chosen bleed port can yield a bleed pressure slightly above or near the required cabin pressurization. Each bleed pressure that is slightly above or near the required cabin pressurization can be a pressure selected from a range of 2.5 psi below the required cabin pressurization to 5 psi greater than the required cabin pressurization. The one or more chosen bleed ports will be a first set of ports. From the first set of ports, a second set of one or more ports are chosen based on which are the most universal all of the for all flight segments.

For example, after applying the above method, three modes were identified. Mode A identified a bleed port at an early stage along on the engine (e.g., a low pressure port). The low pressure port can be used for climb and cruise flight segments. The low pressure port can also be a bleed port that is in-between spools of the engine.

Mode B identified a bleed port at a late stage along on the engine (e.g., a high pressure port). The high pressure port can be arranged at or near high spool compressor discharge of an engine. The high pressure port can be used for descend, ground idle, and taxi flight segments (e.g., used when the engine is operating at an idle speed).

Mode C identified a bleed port at a stage between the early and late stage of the engine (e.g., an intermediate pressure port). The intermediate pressure port can be used for a hold flight segment. Note that once the method has selected the one or more bleed ports, the system can subsequently be modified to work with that bleed port.

In view of the above, the method of selecting the bleed port on the engine that is suitable to provide the bleed air for cabin pressurization at high fuel burn efficiency will now be described. In this example, the intermediate pressure port is initially utilized for all operating conditions outside of idle speed, such as take-off, climb, cruise, hold, etc. The intermediate pressure port is arranged within the engine based on a highest altitude and hottest day flight condition (e.g., a hot day cruise condition). However, outside of this hot day cruise condition, energy within the bleed air from the intermediate pressure port is wasted.

Figure 2:
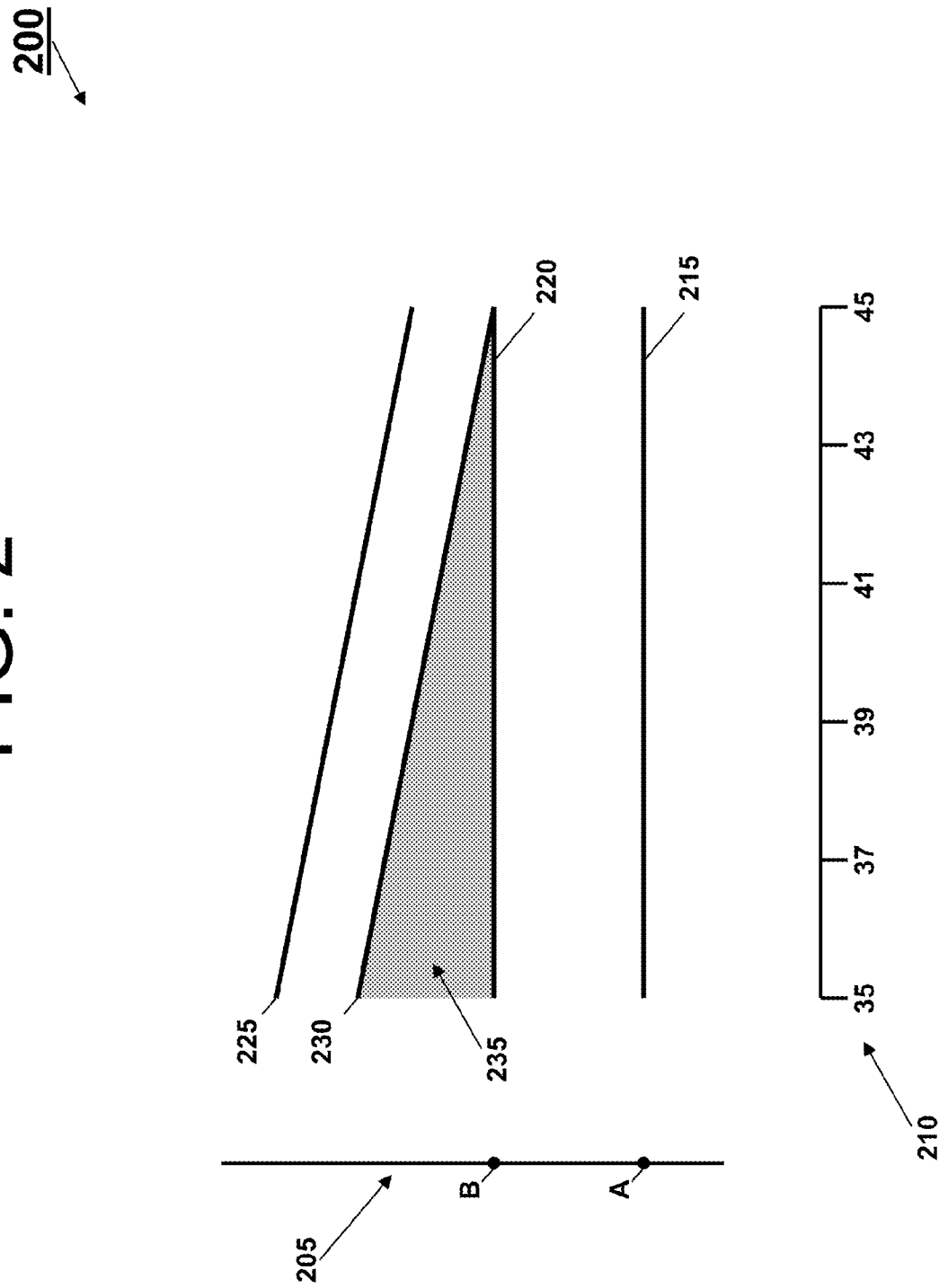
FIG. 2 is a graph of a compression of an environmental control system according to an embodiment.

For example, FIG. 2 shows a graph 200 of a compression of an environmental control system (e.g., 100) according to an embodiment. The graph 200 illustrates a bleed pressure comparison with respect to selecting a location of the intermediate pressure port within the engine based on the hot day cruise condition. That is, the graph 200 shows an end result of basing bleed port selection based on the hot day cruise condition.

The graph 200 illustrates a y-axis 205 indicating pressure and an x-axis 210 indicating altitude (at a factor of 1000 feet). Further, the graph illustrates a cabin pressure 215 (at a first pressure A), a required pressure 220 (at a second pressure B), a bleed pressure 225, a pressure at a pack interface 230, and a waste area 235. During the hot day cruise condition, such as when an airplane is cursing at 43,000 feet on a hot day, there is very little or no wasted bleed pressure 225 (or energy). This hot day cruise condition represents less than 15% of actual flight conditions of the airplane. That is, in every other flight condition or 85% of operational airplane time, there is a significant amount of waste (e.g., as indicated by the waste area 235).

To avoid this significant amount of waste, the intermediate pressure port can be arranged within the engine based on normal cruising altitudes and flight temperatures of standard operating conditions (e.g., the intermediate pressure port can be optimized for 85% of the actual flight conditions of the airplane). During standard operating conditions, less energy within the bleed air from the intermediate pressure port is wasted than in the hot day cruise condition.

Figure 3:
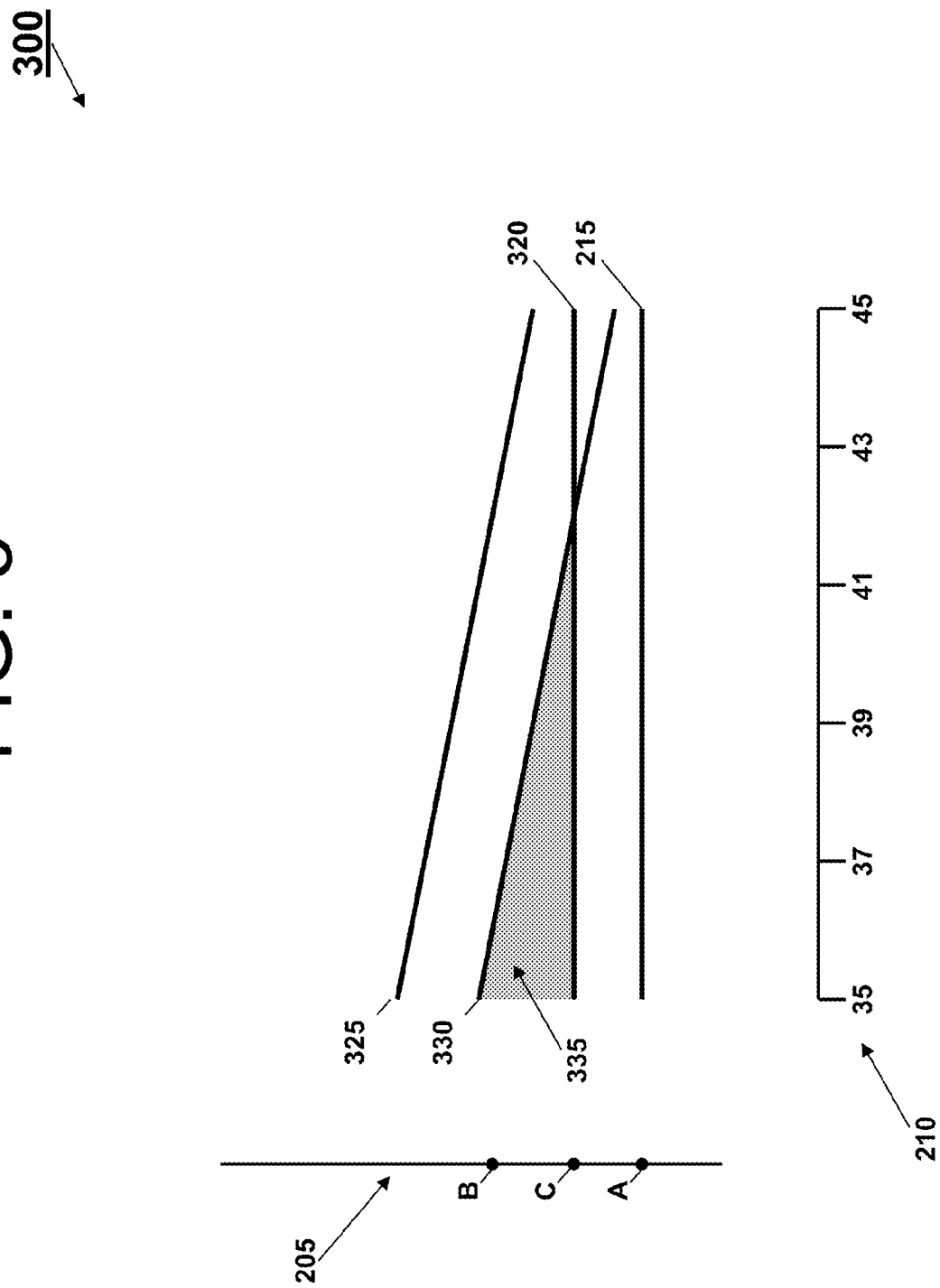
FIG. 3 is another graph of a compression of an environmental control system according to an embodiment.

For example, FIG. 3 shows a graph 300 of a compression of an environmental control system (e.g., 100) according to an embodiment. The graph 300 illustrates a bleed pressure comparison with respect to selecting a location of the intermediate pressure port within the engine based on the standard operating condition. That is, the graph 300 shows an end result of basing bleed port selection based on 85% of the actual flight conditions of the airplane.

Components of the graph 300 that are similar to the graph 200 have been reused for ease of explanation, by using the same identifiers, and are not re-introduced. The graph 300 illustrates a required pressure 320 (at a third pressure C), a bleed pressure 325, a pressure at a pack interface 330, and a waste area 335. Note that in graph 300, the required pressure 315 is lower than the required pressure 215 (e.g., the third pressure C is closer to the first pressure A than the second pressure B). Further, note that the amount of waste has been significantly reduced (e.g., the waste area 335 is less than waste area 235, as the slope of the bleed pressure 225 and bleed pressure 325 is the same), and therefore the energy used by the system 100 is reduced by a third to a half.

Yet, a challenge is inherent to selecting the intermediate bleed port with respect to the standard operating conditions as the pressure at the pack interface 330 drops below the required pressure 320 for the hot day cruise condition. Embodiments of the system 100 will now be described that address this challenge.

Figure 4:
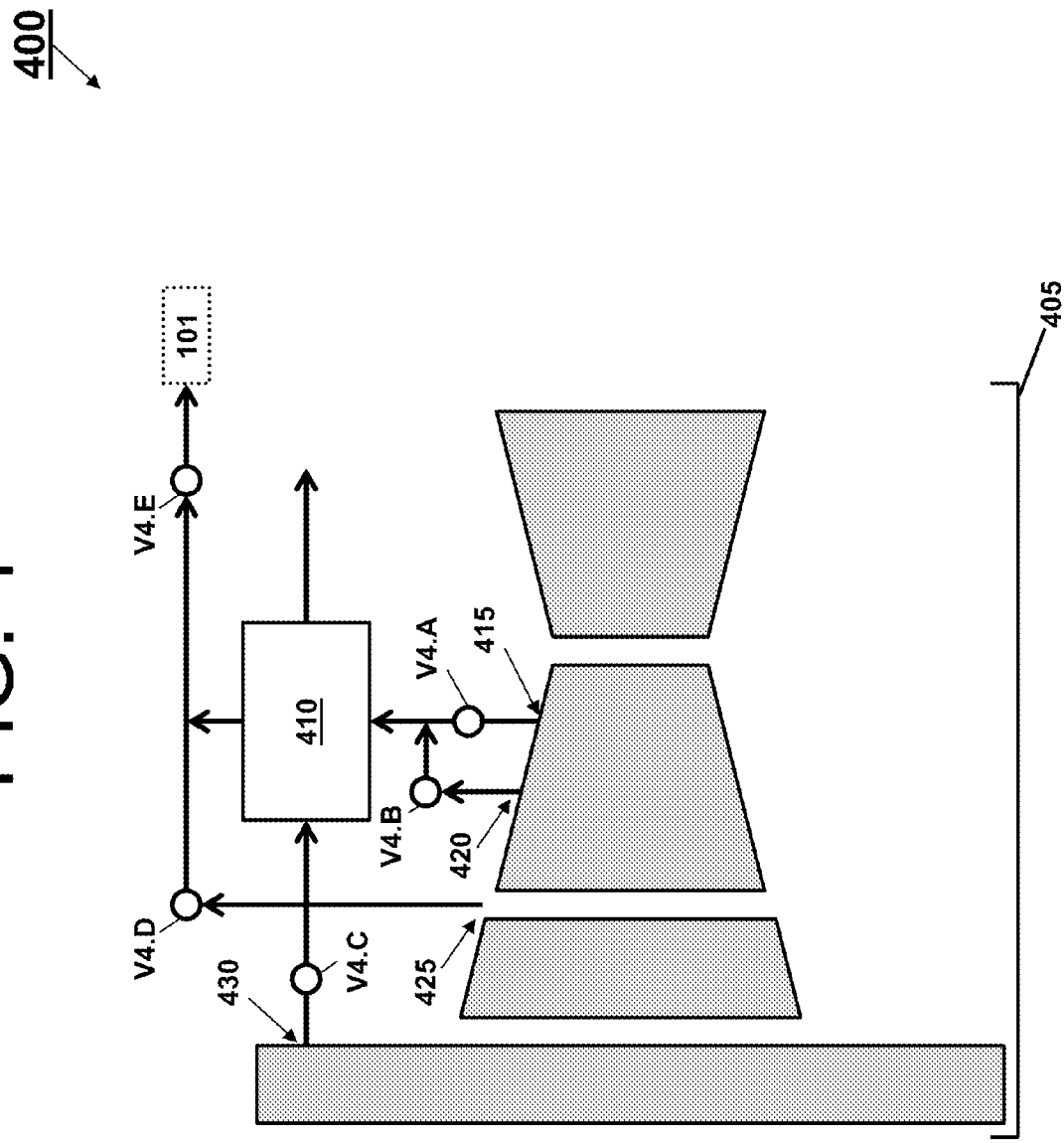
FIG. 4 is a schematic of an example of a three port bleed configuration according to an embodiment.

In an embodiment to address the challenge of the hot day cruise condition, FIG. 4 illustrates an example of a three port bleed system 400 utilized by the system 100. The three port bleed system 400 includes a precooler 410 and a plurality of valves V4.A, V4.B, V4.C, V4D, and V4.E. The precooler 410 can be designed to provide 400° F. to 450° F. air. The three port bleed system 400 also includes an engine 405 that provides bleed air from a plurality of ports (a first port 415, a second port 420, and a third port 425).

The first port 415 can be a high pressure port used for engine idle conditions, thereby being applicable to cause the three port bleed system 400 to operate in the Mode B described above. The second port 420 can be an intermediate pressure port used for hot-day cruise high-altitude cruise and/or for holding in icing conditions, thereby being applicable to cause the three port bleed system 400 to operate in the Mode C described above. The third port 425 can be a low pressure port used for take-off, climb, nominal-cruise, etc., thereby being applicable to cause the three port bleed system 400 to operate in the Mode A described above. A location of the third port 425 is arranged within the engine 405 based on the standard operating conditions. Also, fan air 430 can be extracted from a fan stream and utilized by the precooler 410 to receive heat rejected from bleed air from either of the first or second ports 415 and 420. Note that, when the third port 425 is selected, the precooler 410 can be bypassed. By bypassing the precooler 410 in this way, the precooler 410 can be optimized for the second port 420. With respect to the above method, the system 100 can be configured (or modified) to work with the bleed ports 415, 420, and 425of the three port bleed system 400. To work with the bleed ports 415, 420, and 425, the system 100 is configured to augment the bleed pressure slightly above or near the required cabin pressurization. The result of this configuration can be one or more of a reduction of size of the precooler 410, a bypassing of the precooler 410, and a deletion of the precooler 410. That is, if the three port bleed system 400 enables bleed ports with temperatures below an auto-ignition temperature of fuel, then the precooler 410 can be bypassed or deleted all together. Otherwise, if the precooler 410 is needed for certain operating condition, then the precooler 410 can be a reduced size to meet those conditions.

For example, the selection of the second port 420 can be based on the hot day cruise condition and/or on the airplane hold condition in icing conditions, so that parameters surrounding these conditions can be used to size the precooler 410. That is, if the hot day cruise condition is selected, an airplane's fuel burn is optimized for a small amount of flight conditions that occur on hot days, while a size and a weight of the precooler 410 can be reduced. If the holding in icing conditions is selected, a small amount of performance is sacrificed at the hot day cruise condition, while the size and the weight of the precooler 410 can be greatly reduced. The reduction in the size and the weight of the precooler 410 provides additional benefits for a majority of cruise conditions.

In view of the above aircraft example, the below embodiments can eliminate the primary heat exchanger 120 of FIG. 1 when combined with any of the three port bleed systems described above (e.g., there is no heat exchanger between an engine and an air cycle machine thereby creating a lowest possible pressure drop path). The elimination of the primary heat exchanger 120 of FIG. 1 will now be described with respect to a hot day ground case. In this case, the turbine 113 is driving both the compressor 112 and the fan 116. During design of the environmental control system 100, a balance is struck between turbine, fan, and compressor performance and a mechanical speed is chosen. This balance then defines a type of rotor for the fan 116, the turbine 113, and the compressor 112. An end result can be centrifugal or radial compressor with peak efficiency in an 80% range. However, a centrifugal compressor has a limited corrected flow operating range in which the compressor 112 has a high efficiency. As a result, at the cruise condition when the pressure into the compressor 112 is less than 30 psia, the compressor 112 can only efficiently compress 50% of flow of bleed air. If the compressor 112 is required to compress more air that 50%, the efficiency of the compressor 112 falls off. In fact, if 100% of the flow is required to be compressed, the efficiency of the compressor 122 can be as low as 30%.

Figure 5:
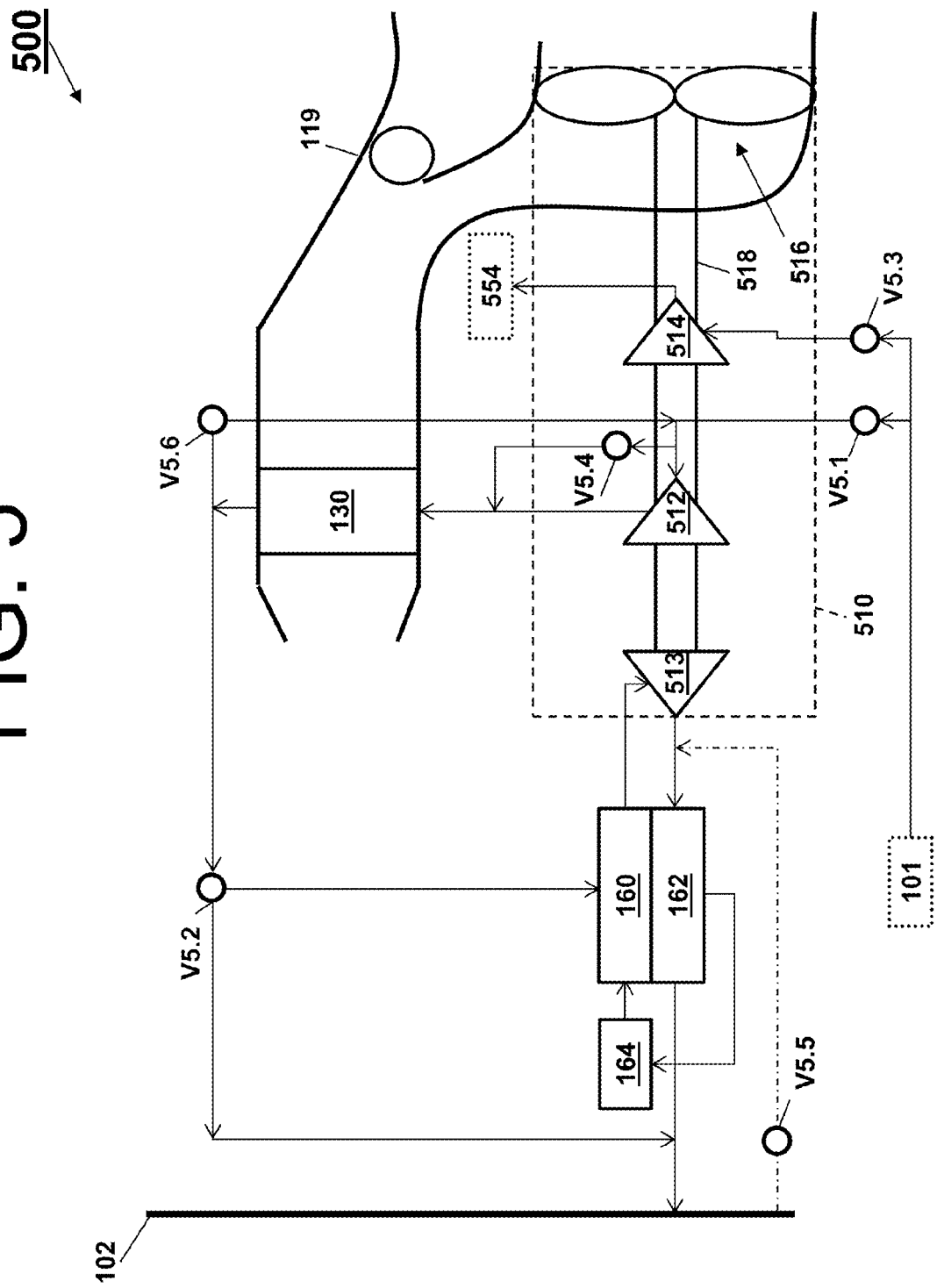
FIG. 5 is operation example of an environmental control system, where the environmental control system eliminates a primary heat exchanger, according to an embodiment.

Turning now to FIG. 5, a schematic of an environmental control system 500 (e.g., an embodiment of system 100) is depicted according to an embodiment. Components of the system 100 that are similar to the environmental control system 500 have been reused for ease of explanation, by using the same identifiers, and are not re-introduced. Alternative components of the environmental control system 500 include a compressing device 510 that comprises a compressor 512, a turbine 513, a turbine 514 (a.k.a. a power turbine), a fan 516, and a shaft 518. Alternative components of the environmental control system 500 also include an outlet 554, along with valves V5.1, V5.3, V5.4, V5.5, and V5.6 that control flow paths of one or more mediums.

The environmental control system 500 can utilize a first medium sourced from inlet 101 at pressures as low as 2.5 psi below a pressure of the chamber 102. The first medium can be referred to as bleed air as indicated above with respect to system 100. The environmental control system 500 can mix the bleed air with other mediums at a mixing point downstream of the turbine 513 (e.g., between the turbine 513 and the condenser 162 of the high pressure water separator). The environmental control system 500 can utilize the bleed air to power the turbine 514.

The environmental control system 500 can also utilize a second medium sourced from the chamber 102. When the second medium is being provided from the chamber 102 (e.g., a pressurized volume, cabin of the aircraft, or cabin and flight deck of the aircraft), the medium can be referred as recirculation air (also known as pressured air, chamber discharge air, or cabin discharge air). In addition, in one or more embodiments, an exhaust from the turbine 514 can be sent to the outlet 554 connected to another system as shown, released to ambient air through the shell 119, dumped overboard, etc. The environmental control system 500 can mix the second medium and the first medium at a mixing point downstream of the turbine 513. The environmental control system 500 can utilize the second medium to power the turbine 514.

Figure 6:
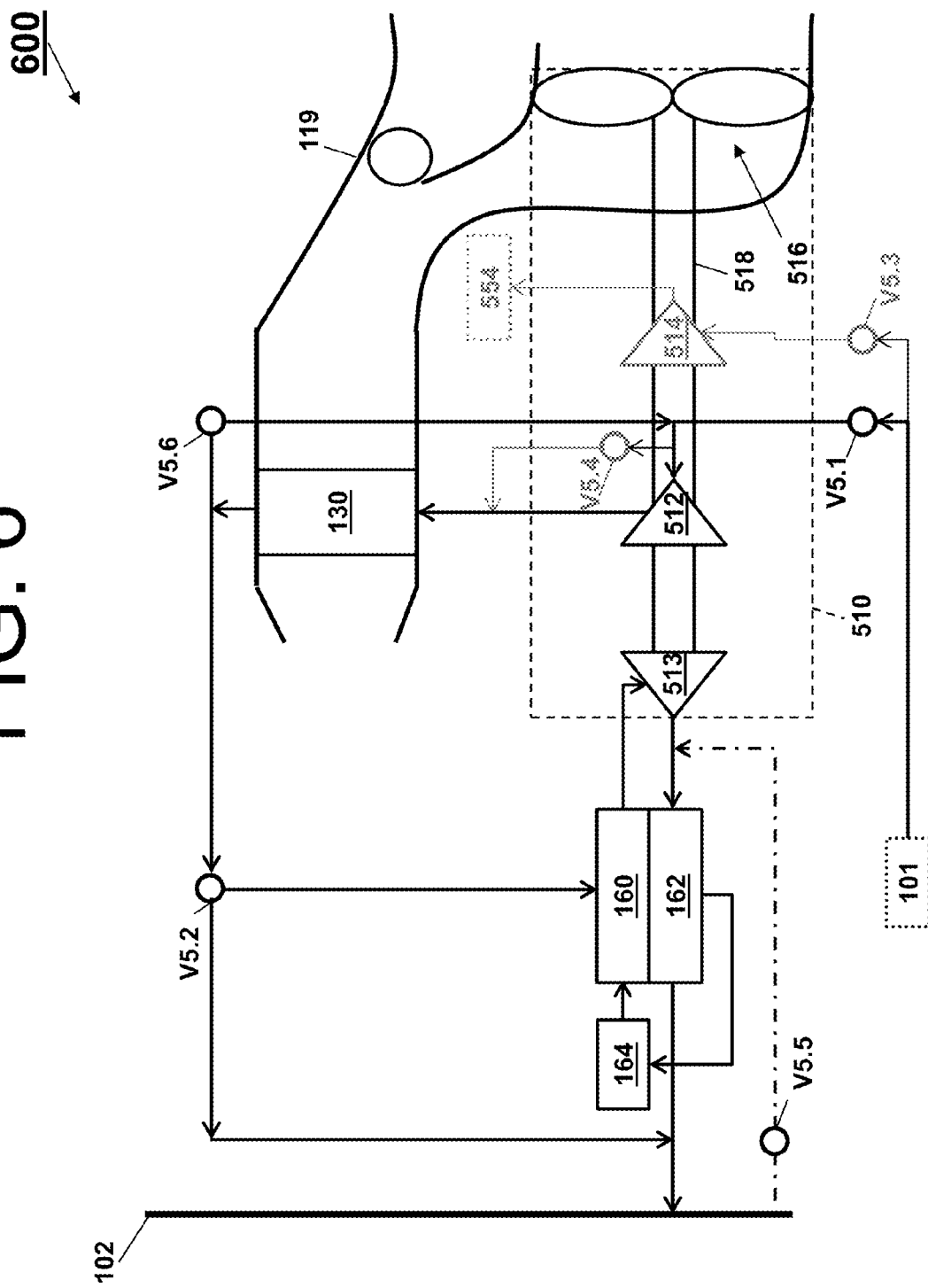
FIG. 6 is operation example of the environmental control system of FIG. 5 according to an embodiment.

Turning now to FIGS. 6-9, operation examples of the environmental control system 500 of FIG. 5 will now be described. FIG. 6 illustrates the environmental control system 500 as an environmental control system 600 in a high pressure operation. In the high pressure operation, the first medium can be high-pressure high-temperature air sourced from inlet 101 (e.g., such as a high pressure port of an engine). The high-pressure high-temperature air enters the compressor 512 via valve V5.1. The compressor 512 pressurizes the high-pressure high-temperature air (and in the process heats it). This heated air then enters the secondary heat exchanger 130 and is cooled by ram air to approximately ambient temperature to produce cool high pressure air. The cool high pressure air enters the high pressure water separator, where the cool high pressure air goes through the high pressure water separator to produce warm high pressure and now dry air. The warm high pressure and now dry air enters the turbine 513, where it is expanded and work extracted. The work from the turbine 513 drives the compressor 513 and the fan 516, which is used to pull ram air flow through the secondary heat exchanger 130. After leaving the turbine 513, the cold air (typically below freezing), is mixed with recirculation air, cools the warm moist air in the condenser 162, and is then sent to condition the chamber 102.

The high pressure operation is a mode of operation (e.g., Mode B) that can be used at flight conditions when an engine pressure is adequate to drive the compressing device 510 or when a cabin temperature demands it. For example, conditions such as ground idle, taxi, take-off, climb, descent, and hold conditions would have the packs operating in a high pressure mode. In addition, extreme temperature high altitude cruise conditions could result in one or of the more packs operating in this mode.

Figure 7:
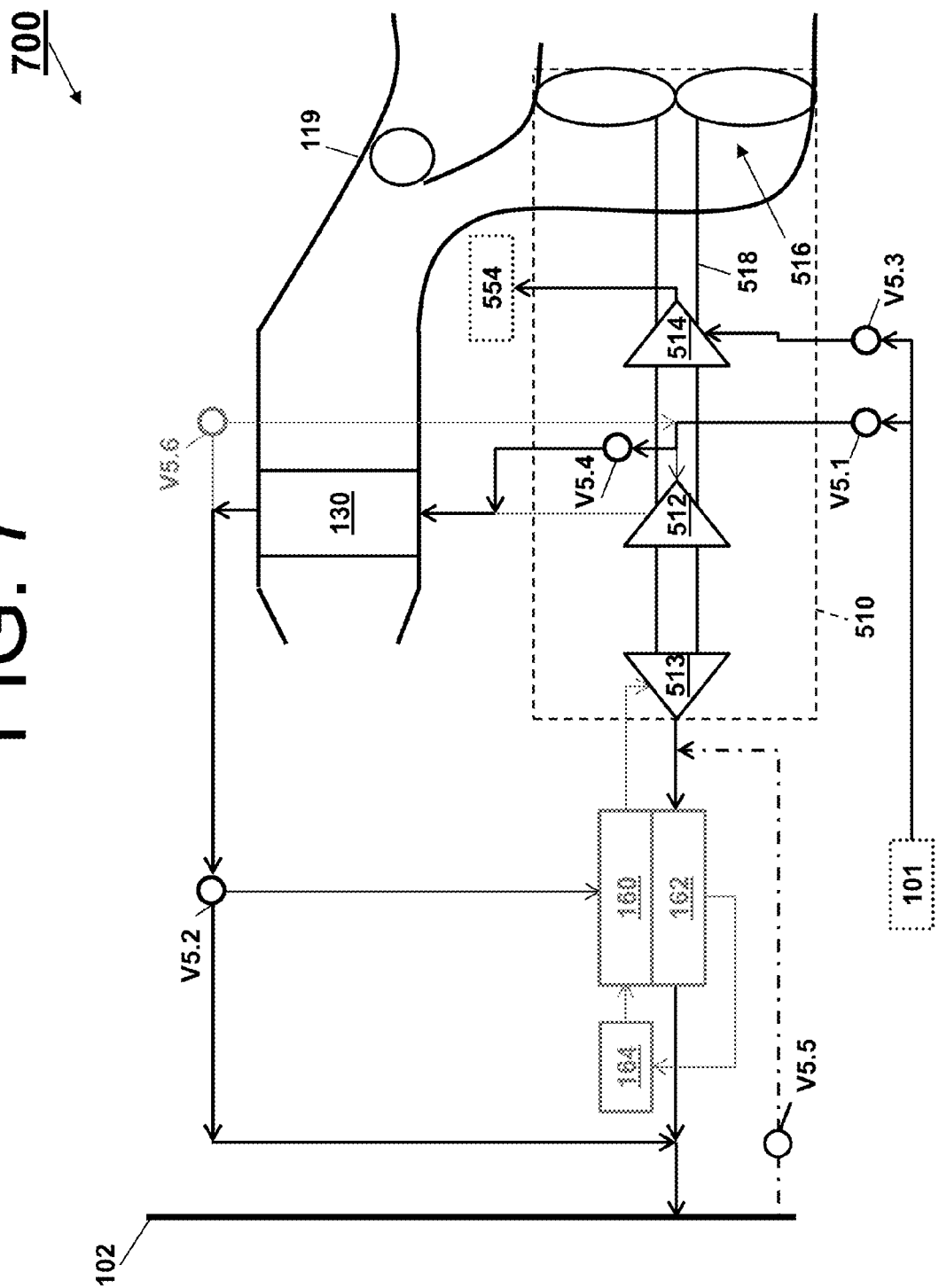
FIG. 7 is operation example of the environmental control system of FIG. 5 according to an embodiment.

FIG. 7 illustrates the environmental control system 500 as an environmental control system 700 in a low pressure operation. In the low pressure operation, a first portion of a first medium sourced from inlet 101 (e.g., such as a low pressure port of an engine) can bypass the compressing device 510. The first portion of the first medium then enters the secondary heat exchanger 130 and is cooled by ram air to the temperature requested by the chamber 102. The first portion of the first medium then goes directly into the chamber 102 via valve V5.2 (note that the first portion of the first medium can be mixed with recirculation air as shown). Further, the first medium can also be used to keep the compressing device 510 turning at a minimum speed. For example and as shown in FIG. 7, a second portion of the first medium through valve V5.3 enters the turbine 514 where it is expanded so that and work is extracted. This work is just enough to turn the compressing device 510 at its minimum speed (approximately 6000 rpm). The second portion of the first medium exiting the turbine 514 can be sent to the outlet 554 connected to another system as shown, released to ambient air through the shell 119, dumped overboard, etc. In another embodiment, cabin discharge air can be fed to the turbine 514 to maintain the compressing device at the minimum speed.

The low pressure operation is a mode of operation (e.g., used with respect to Mode A) that can be used at flight conditions when a pressure of the air from the engine entering the compressing device 510 is above a pressure of the chamber 510. For example, conditions such as cruise at altitudes above 30,000 feet and at or near standard ambient day types would have the packs operating in a low pressure mode.

Figure 8:
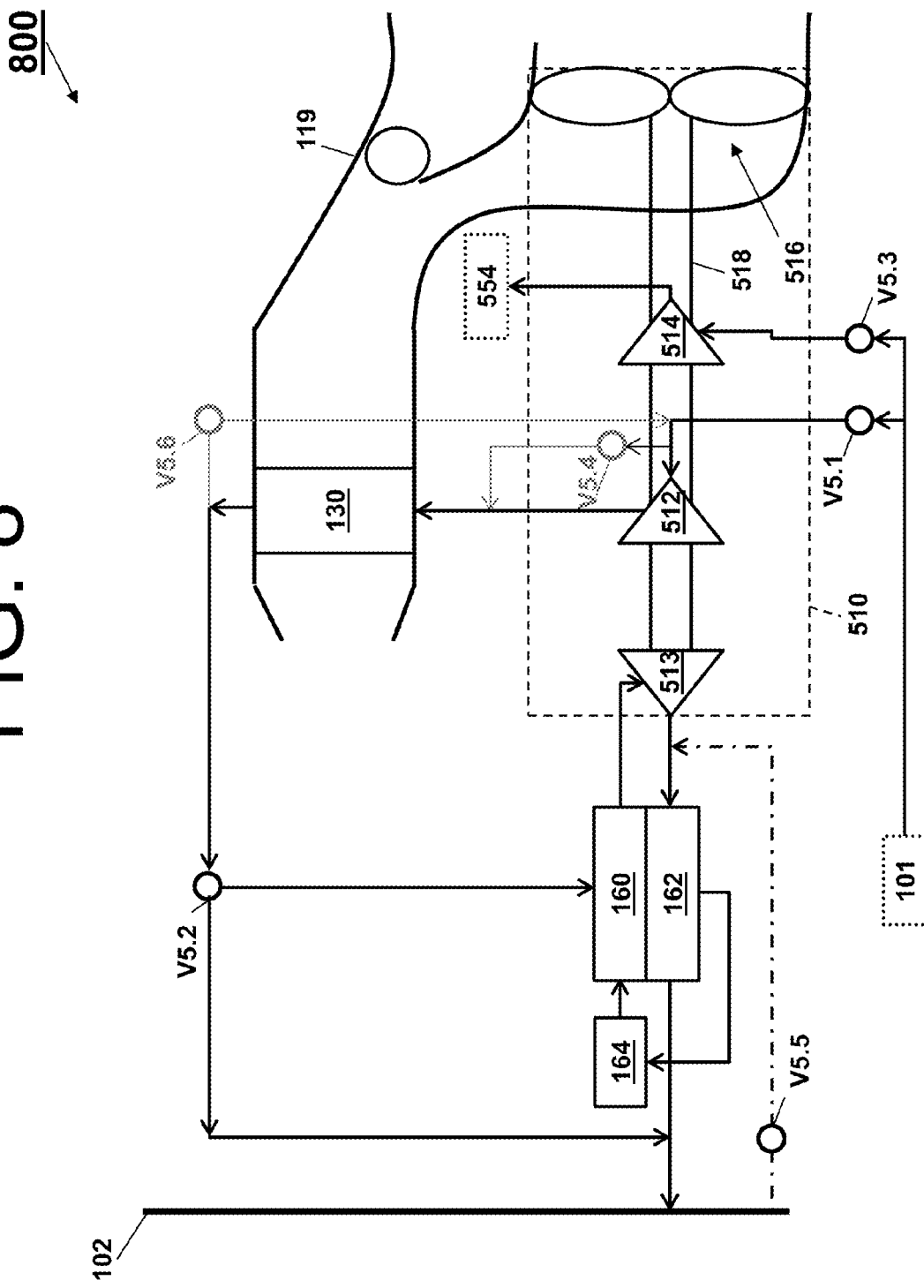
FIG. 8 is operation example of the environmental control system of FIG. 5 according to an embodiment.

FIG. 8 illustrates the environmental control system 500 as an environmental control system 800 in a boost cooling operation. In the boost cooling operation, a first portion of a first medium sourced from inlet 101 can be low pressure air sourced from inlet 101 (e.g., such as a low pressure port of an engine). The low pressure air enters the compressor 512 via valve V5.1. The compressor 512 pressurizes the low pressure air (and in the process heats it). This heated air then enters the secondary heat exchanger 130 and is cooled by ram air to produce cool high pressure air. The cool high pressure air enters the high pressure water separator (where it is cooled and dried) and proceeds to the turbine 513, where it is expanded and work extracted. After leaving the turbine 513, the cold air (typically below freezing), is mixed with recirculation air, cools the warm moist air in the condenser 162, and is then sent to condition the chamber 102.

The work from the turbine 513 drives the compressor 513 and the fan 516, which is used to pull ram air flow through the secondary heat exchanger 130. Further, in the boost cooling operation, additional energy is provided to the compressing device 510 by expanding a second portion of the first medium via valve V5.3 across the turbine 514. In turn, a compressor discharge pressures result in high pressures that drive all or part of the first medium through the turbine 513.

The boost cooling operation is a mode of operation (e.g., used with respect to Mode A) that can be used at flight conditions when a pressure of bleed air from the engine entering the pack is above the cabin pressure and the ram air temperatures are too high to cool the bleed air to the required temperature. For example, conditions such as cruise at altitudes above 30,000 feet and hot ambient day types would have the packs operating in a boost cooling mode.

Figure 9:
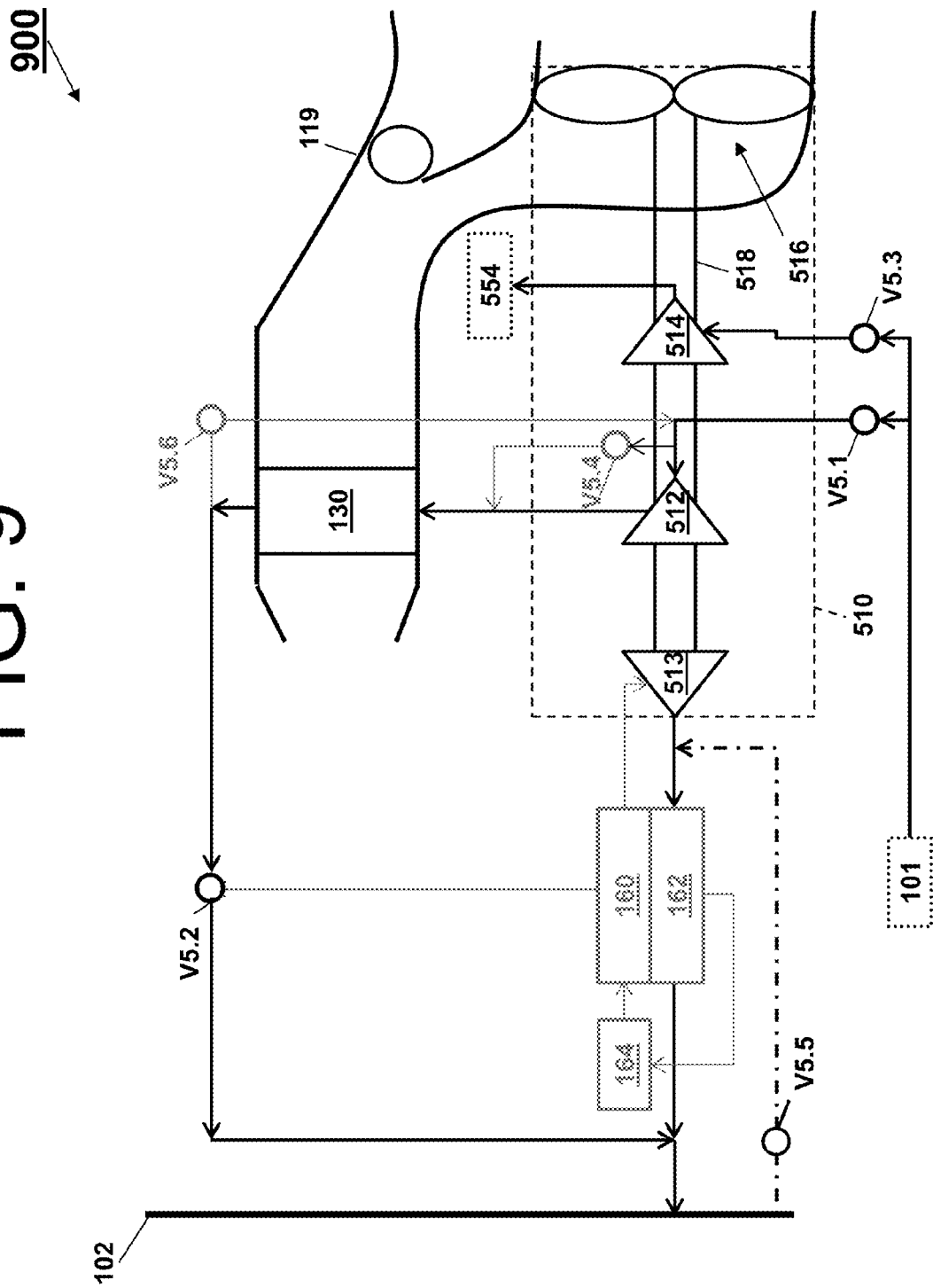
FIG. 9 is operation example of the environmental control system of FIG. 5 according to an embodiment.

FIG. 9 illustrates the environmental control system 500 as an environmental control system 900 in a pressure boost operation. In the pressure boost operation, a first portion of a first medium sourced from inlet 101 can be low pressure air sourced from inlet 101 (e.g., such as a low pressure port of an engine). The first portion of the first medium enters the compressor 512 via valve V5.1. The compressor 512 pressurizes the first portion of the first medium (and in the process heats it). This heated air then enters the secondary heat exchanger 130 and is cooled by ram air to produce cool air. The cool air then goes directly into the chamber 102 via valve V5.2 (note that the first portion of the first medium can be mixed with recirculation air as shown).

In this case, a second portion of the first medium via valve V5.3 (as shown) can be used to provide energy to pressurize the first portion of the bleed air that is provide to the chamber 102. The second portion of the first medium enters the turbine 514, expands, and work is extracted. This work turns the compressing device 510 at the speed required by the compressor 512 to raise the pressure of the first portion of the first medium to a high enough to get it through the secondary heat exchanger 130 and into the chamber 102. The second portion of the first medium exiting the turbine 514 can then be sent to the outlet 554 connected to another system as shown, released to ambient air through the shell 119, dumped overboard, etc. In another embodiment, cabin discharge air can be fed to the turbine 514 to maintain the compressing device at the minimum speed.

The pressure boost operation is a mode of operation (e.g., used with respect to Mode A) that can be used at flight conditions when a pressure of bleed air from thane engine entering the pack is as low as 2.5 psi below the cabin pressure. For example, conditions such as cruise at altitudes above altitudes above 30,000 feet and at or near standard ambient day types would use this mode.

The elimination of the primary heat exchanger 120 of FIG. 1 will now be described with respect to a hot day ground embodiment. In this embodiment, the environmental control system 500 provides pressurization operations at pressures at an inlet of the compressor 512 that are lower than a pressure of the chamber. The environmental control system 500 can employ a compressor type that has a high efficiency over a wider operating range, such as a mixed flow compressor (which is in-between an axial compressor and a centrifugal compressor). The mixed flow compressor has a much wider operating range in which peak efficiency is maintained; nearly twice the operating range. Thus, the compressor 512 can operate efficiency over inlet pressure ranges from 10 to 50 psia. Another advantage of the mixed flow compressor is that the mixed flow compressor allows an air cycle machine mechanical speed to be increased. This has two advantages. The first advantage is higher speeds result in smaller rotors and lighter Air cycle machines. The second advantage is the high speed can result is the turbines 513 and 514 operating at peak efficiency at the hot day ground condition. Higher efficiency turbines result in smaller ram air heat exchangers (e.g., the elimination of the primary heat exchanger 120 and/or a reduction of the secondary heat exchange 130) and overall lighter weight of the environmental control system 500.

In another embodiment, the environmental control system 500 can employ a compressor type that has a high efficiency over a wider operating range, such as a compressor that comprises a variable geometry (i.e., a variable vaned diffuser). The variable vaned diffuser comprises a plurality of vanes, each of which is configured to rotate about a pin as an articulating member moves the plurality of vanes, and provides a very high operating range with a high efficiency.

In another embodiment, when utilizing low bleed pressure, a turbo compressor upstream of the pack can be added to the environmental control system 500 to compress air to a suitable pressure. In this embodiment, engine bleed air is compressed by the turbo compressor when the bleed pressure is low and then supplied to the pack. Since the mixed flow compressor operates efficiency over such a wide range, the air cycle machine can operate as an air cycle machine and a turbo compressor, which reduces/eliminates cost, complexity, and weight of the turbo compressor.

According to an embodiment, an airplane is provided. The airplane comprises a pressurized compartment; an environmental control system comprising a compressing device, the compressing device comprising a compressor and a turbine; a first flow of first medium configured to enter the pressurized compartment; and a second flow of the first medium configured to enter the turbine.

According to another embodiment or the airplane embodiment above, the second flow of the first medium can be sent overboard after exiting the turbine.

According to another embodiment or any of the airplane embodiments above, the first flow of the first medium can be configured to enter the compressor.

According to another embodiment or any of the airplane embodiments above, the environmental control system can comprise a ram air heat exchanger.

According to another embodiment or any of the airplane embodiments above, the environmental control system can comprise a plurality of compressors that include the compressor, a plurality of turbines that include the turbine, and at least one fan.

According to another embodiment or any of the airplane embodiments above, a second medium can mix with the first medium downstream of the turbine.

According to another embodiment or any of the airplane embodiments above, the first medium can comprise bleed air and the second medium can comprise recirculation air.

According to another embodiment or any of the airplane embodiments above, the environmental control system can comprise a high pressure water separator.

According to another embodiment or any of the airplane embodiments above, the second medium can mix with the first medium between of the turbine and a condenser of the high pressure water separator.

According to another embodiment or any of the airplane embodiments above, the environmental control system can be configured to operate in a high pressure mode.

According to another embodiment or any of the airplane embodiments above, the environmental control system can be configured to operate in a low pressure mode.

According to another embodiment or any of the airplane embodiments above, the environmental control system can be configured to operate in a boost cooling mode.

According to another embodiment or any of the airplane embodiments above, the environmental control system can be configured to operate in a pressure boost mode.

According to another embodiment or any of the airplane embodiments above, the first flow of the first medium can comprise a first portion of bleed air and the second flow of the first medium can comprise a second portion of bleed air.

According to another embodiment or any of the airplane embodiments above, the first flow of the first medium can comprise a bleed air and the second flow of the first medium can comprise a cabin discharge air.

According to another embodiment or any of the airplane embodiments above, the first flow of the first medium can comprise air from an electric air compressor and the second flow of the first medium can comprise a cabin discharge air.

According to another embodiment or any of the airplane embodiments above, the first flow of the first medium can be a first portion of air from an electric air compressor and the second flow of the first medium can be a second portion of air from an electric air compressor.

According to another embodiment or any of the airplane embodiments above, the compressor can be a mixed flow compressor.

According to another embodiment or any of the airplane embodiments above, the compressor can comprise a variable geometry.

According to another embodiment or any of the airplane embodiments above, the first flow can enter the compressor prior to entering a ram air heat exchanger.

According to an embodiment, an airplane is provided. The airplane comprise a pressurized compartment; an environmental control system comprising a compressing device, the compressing device comprising a compressor and a turbine; a first flow air configured to enter the pressurized compartment and configured to enter the compressor in accordance with a mode of operation; and a second flow air configured to enter the turbine and to be sent overboard after exiting the turbine.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

The invention claimed is:

1. An airplane comprising:
a pressurized compartment;
an environmental control system comprising a compressing device,
the compressing device comprising a compressor and a turbine;
a first flow of a first medium configured to enter the pressurized compartment; and
a second flow of the first medium configured to enter the turbine,
wherein the environmental control system is configured to operate in a boost cooling mode when a pressure of the first medium is above a cabin pressure and ram air temperatures are unable to cool the first medium to a required temperature,
wherein, in the boost cooling mode, energy is provided to the compressing device by expanding a second flow of the first medium across the turbine.

2. The airplane of claim 1, wherein the second flow of the first medium is sent overboard after exiting the turbine.

3. The airplane of claim 1, wherein the first flow of the first medium is configured to enter the compressor.

4. The airplane of claim 1, wherein the environmental control system comprises a ram air heat exchanger.

5. The airplane of claim 1, wherein the environmental control system comprises a plurality of compressors that include the compressor, a plurality of turbines that include the turbine, and at least one fan.

6. The airplane of claim 1, wherein a second medium mixes with the first medium downstream of the turbine.

7. The airplane of claim 6, wherein the first medium comprises bleed air, and
wherein the second medium comprises recirculation air.

8. The airplane of claim 6, wherein the environmental control system comprises a high pressure water separator.

9. The airplane of claim 8, wherein the second medium mixes with the first medium between of the turbine and a condenser of the high pressure water separator.

10. The airplane of claim 1, wherein the environmental control system is configured to operate in a high pressure mode.

11. The airplane of claim 1, wherein the environmental control system is configured to operate in a low pressure mode.

12. The airplane of claim 1, wherein the environmental control system is configured to operate in a pressure boost mode.

13. The airplane of claim 1, wherein the first flow of the first medium comprises a first portion of bleed air, and
wherein the second flow of the first medium comprises a second portion of bleed air.

14. The airplane of claim 1, wherein the first flow of the first medium comprises a bleed air and the second flow of the first medium comprises a cabin discharge air.

15. The airplane of claim 1, wherein the first flow of the first medium comprises air from an electric air compressor, and
wherein the second flow of the first medium comprises a cabin discharge air.

16. The airplane of claim 1, wherein the first flow of the first medium is a first portion of air from an electric air compressor, and
wherein the second flow of the first medium is a second portion of air from an electric air compressor.

17. The airplane of claim 1, wherein the compressor comprises at least one of a mixed flow compressor and a variable geometry.

18. The airplane of claim 1, wherein the first flow enters the compressor prior to entering a ram air heat exchanger.

19. An airplane comprising:
a pressurized compartment;
an environmental control system comprising a compressing device,
the compressing device comprising a compressor and a turbine;
a first flow air configured to enter the pressurized compartment and configured to enter the compressor in accordance with a mode of operation; and
a second flow air configured to enter the turbine and to be sent overboard after exiting the turbine,
wherein the environmental control system is configured to operate in a boost cooling mode when a pressure of the first medium is above a cabin pressure and ram air temperatures are unable to cool the first medium to a required temperature,
wherein, in the boost cooling mode, energy is provided to the compressing device by expanding a second flow of the first medium across the turbine.

* * * * *